United States Patent Office 3,271,165
Patented Sept. 6, 1966

3,271,165
POWDER PRODUCED FROM BUTTER OR OTHER EDIBLE FATS
Poul Martin Trøst Hansen, Cheltenham, Victoria, and Lois Linton-Smith, Lower Plenty, Victoria, Australia, assignors to Commonwealth Scientific and Industrial Research Organization, East Melbourne, Victoria, Australia, a corporation
No Drawing. Filed May 13, 1963, Ser. No. 280,122
19 Claims. (Cl. 99—118)

This invention relates to edible fat-containing compositions in powder form made from butter or other fat and suitable for use as shortening materials. In the present specification and claims, the term "fat" is used in its ordinary meaning to include both solid and liquid oils.

Normal butter is a product which by regulation contains at least 80% milk fat, sometimes 82%, and not more than 16% water. Normal butter also contains salt, in an amount which is usually about 1 to 2%, and in addition there are milk solids present, amounting to 0.5 to 2% depending on the manufacturing technique. Butter is manufactured either by the conventional churning process, which results in the formation of granules of butter and separation of butter milk, or by one of the so-called "continuous" methods.

The plasticity of normal butter is desirable when the butter is to be used for spreading, but is in many ways undesirable when the butter is to be used as a baking ingredient, particularly in prepared dry cake-mixes. For use as a baking ingredient the butter needs to be brought into a finely-divided state, and it is therefore understandable that the techniques of creaming butter with sugar, or the melting or extrusion of butter for blending with dry ingredients, are tasks which have been accepted as necessary in all domestic and industrial baking methods.

It is known that powders with a substantial fat content may be manufactured for example by drying a homogeneous mixture comprising fat and an aqueous dispersion of non-fatty materials such as proteins, starches or gum. Dry whole milk is an example of such a product; it contains approximately 27% fat, 3% moisture and 70% skim milk solids. Higher ratios of fat to skim milk solids can be obtained by drying milk or cream with a correspondingly higher fat content; however, such powders are usually difficult to manipulate by conventional drying methods, and are not free-flowing.

Conceivably any powder with a substantial fat content could be used as the source of fat in baking and cooking, and such powders would have the advantage over other types of shortening of lending themselves well to blending with other dry ingredients. However, a powder with a low ratio of fat to non-fat milk solids, for example dry whole milk, gives rise to difficulties in adjusting the baking formula to allow for the additional non-fat milk solids which necessarily accompany the fat.

Conventional powdered shortenings are frequently observed to give a poor baking performance, however, especially in cakes and similar goods. Cakes made from dried cream or dried modified creams are notably poor since they attain neither the texture nor the volume which normally results. A reason for this is probably that the fat in the powder is in a finely dispersed state, and coated or otherwise associated with the non-fat material, and so is not susceptible to aggregation by agitation and is not in a suitable form for stabilising incorporated air. Cake batters made from such powders have been observed to possess a high specific gravity, indicating insufficient aeration. Similar disadvantageous features are observed when such emulsifying agents as are usually employed by the food industry are added.

According to the present invention, a method of making an edible fat-containing composition in powder form suitable for use as a shortening material, comprises the steps of mixing an edible cream in the form of a fat-in-water dispersion containing at least 35% water, with non-fat milk solids and with an edible fat-soluble emulsifying agent in an amount not exceeding 25% of the non-fat solids to form a fat-in-water dispersion system having a fat content comprising at least 80% of the total solids present in the dispersion, and spray-drying the mixture without breaking down the structure thereof to form a powder, the mixing of the emulsifying agent with the other ingredients not involving a homogenizing treatment, whereby a partial de-emulsification takes place when water is added to the dried powder. The product may be dried to have a moisture content below 1% by weight. The fat in the dispersion may be milk fat or other edible fat, for example, coconut oil or peanut oil. Thus the dispersion may be made from fats or oils which are solid or liquid at room temperature.

Normally, the dried product is immediately cooled to room temperature or below, and is blended with a finely-divided physiologically acceptable agent to confer free-flowing properties on the powder. Such agents include suitable silicates and phosphates. The cooling is particularly important when the product is based on milk fat because the cooling hardens the fat and induces a desirable crystalline state therein.

The "cream" used to supply the fat solids may be natural or formulated. In some cases natural cream may be used as the source of fat solids without any homogenizing treatment, but when other sources of fat solids are used, and in some cases with natural cream, a homogenizing step is necessary to produce the necessary stability in the dispersion. Thus a formulated cream for use in accordance with the invention can be made by homogenizing a mixture of fat and non-fat solids, the cream thus produced containing all of the fat but only part of the non-fat solids present in the system prior to drying.

It has also been found that the cream must have a water content of at least 35%. In the case of a formulated product, the emulsion would not form, however long the homogenizing treatment, with a water content below 35%.

When skim milk solids are used to form a homogenized fat dispersion, the addition of a calcium-sequestering agent is desirable to prevent the mixture from thickening in the homogenizer. When casein is incorporated in the homogenized fat dispersion, the casein used may be an edible caseinate at a neutral or alkaline pH, though it is preferred to disperse an edible grade of dry acid casein in water and/or skim milk with the aid of an alkali. Dispersion of casein may for example readily be effected by warming a mixture of:

6 parts of 30-mesh casein;
1 part of sodium citrate or an equivalent amount of sodium carbonate or phosphate;
14 parts of skim milk or water at 120° F.; and
7 parts of 2% sodium hydroxide solution or the equivalent amount of another physiologically acceptable alkali to a temperature within the range 140 to 180° F. and agitating the mixture until the casein is dispersed. The pH of this mixture is close to that of normal milk (6.7). More liquid can be added to make the dispersion less viscous.

A preferred emulsifying agent for admixture with the fat-in-water dispersion is glycerol monostearate, but mixtures of mono- and diglycerides prepared from hydrogenated fats are quite suitable. A commercial product of this type having a glycerol monostearate content of 36% has been used in the formulations described in the examples. The emulsifying agent may be melted, and incorporated with gentle agitation either directly into the fat-in-water dispersion or into a warm dispersion of the milk solids which are to be mixed with the fat-in-water dispersion.

The emulsifying agent is added to the fat-in-water dispersion not only to assist in the mechanical aeration of cake batters in which the dried powder is used, but for its effect on the stability of the dried powder. The method by which the emulsifying agent is incorporated in the concentrate prior to drying is the critical factor with regard to the baking performance of the powder. If all the ingredients were added prior to the homogenizing treatment, the emulsifying agent would stabilize the system to a degree where sufficient free fat would not be released during baking. It is accordingly critical to the present invention that the mixing of the emulsifying agent with the other ingredients does not involve a homogenizing treatment.

Investigations of the microstructure have shown that, in a typical case, the dried powder consists of fat globules (and possibly some free fat) embedded in a mixture of skim milk solids, caseinate and emulsifying agent. It has also been shown that a partial deemulsification takes place when dried powder in accordance with the invention is mixed with water and this provides the necessary release of the fat to give good baking performance. The emulsifying agent appears to be responsible for this because it has been found that the maximum amount that can be incorporated without danger of the powder "breaking down" during drying is about 25% of the non-fat solids present.

If desired, antioxidants can be added with the fat or with the emulsifying agent at permissible levels.

The milk solids which are mixed with the fat-in-water dispersion are preferably in the form of a dispersion, to facilitate mixing. For example, skim milk itself represents a dispersion of skim milk solids which is highly suitable for admixture with the fat-in-water dispersion.

To minimize the cost of spray-drying, the mixture which is submitted to spray-drying preferably has a total solids content of at least 50–60%. However, lower solids contents may also successfully be employed.

Powders of substantial fat content tend to create difficulties due to stickiness during spray drying. This may cause some of the powder to be exposed to heat in the spray-drier for prolonged periods of time which is undesirable. More serious, however, would be the accumulation of deposits in the drier and in the apparatus used for the recovery of air-borne powder particles. Such deposits tend to cake together, thus interfering with the drying process as well as destroying the free flowing nature of the powder. When this occurs the product becomes unusable for its intended purpose.

By suitable selection of spray drying equipment some of these difficulties may be overcome. We have found that driers equipped with filter bag collectors are particularly suitable, whereas driers incorporating cyclones are not so. If the powder is dried in a cyclone-type drier, the frictional forces encountered by the powder disrupt the structure of the product and thus destroy its character as a free-flowing powdered shortening material. On the other hand, driers of the filter bag type avoid the occurrence of these disruptive frictional forces, so that the structure of the powder is preserved and efficient collection can be achieved.

We have found, moreover, that considerable lessening of the difficulties can be achieved by treating the inside walls of a suitable spray drier with an "anti-sticking" agent. An example of such treatment involves applying to the walls a white-wash or spray consisting of a water suspension of finely divided sodium aluminium silicate and allowing the material to dry to give a fine, powdery deposit. The adherence of the silicate to the walls may be improved by the addition of, preferably 20 percent, calcium hydroxide to the silicate before its suspension in water. Calcium hydroxide by itself is also effective, but is less desirable.

The amount of finely-divided silicate or phosphate which is blended with the spray-dried product (after cooling) is preferably ½ to ¾% of the weight of the spray-dried product, whereupon the powder so obtained may be screened through a fine sieve.

Powder made from milk fat in accordance with the invention is light and free-flowing and possesses good storage stability when stored under conditions normally observed for milk powders. The powder does not melt when exposed to a temperature at which normal butter would form an oil, and is found to have outstandingly good baking properties.

Powders made with other edible fats behave in a similar fashion to powder made from milk fat, but lack some of the desirable characteristics such as flavour and colour.

There is a wide choice of non-fat materials which can be used for the production of powders in accordance with the invention, and a variety of powders can therefore be made for specific purposes. For example, it is possible to exclude all lactose from the constituents and thus obtain a powder which will not caramellize during baking. Alternatively, sucrose may be used as a major non-fat constituent. This possibility of varying the composition of the powders is useful in the production of goods such as biscuits in which excessive browning may be unwanted.

The following examples further illustrate the invention.

*Example 1*

Powder with the following compositions:

| | Percent |
|---|---|
| Milk fat | 82.0 |
| Commercial glycerol monostearate | 3.5 |
| Skim milk solids | 6.7 |
| Sodium caseinate-citrate mixture | 6.7 |
| Sodium aluminium silicate | 0.5 |
| Moisture | 0.6 |
| Total | 100.0 | was produced as follows:

45.0 lb. skim milk was pasteurized for 30 minutes at 143° F., whereupon a solution of 0.5 lb. of sodium hexametaphosphate in 5.5 lbs. of water was added to the pasteurized skim milk. 82.0 lbs of dehydrated butter fat were melted and mixed with the treated skim milk. The resulting mixture was then homogenized at a pressure of 700 to 800 p.s.i. and a temperature of 120° F. to form an emulsion.

A casein dispersion was produced by warming a mixture of 6.0 lbs. of dry acid casein, 1.0 lb. of sodium citrate, 20.0 lbs. of skim milk at 120° F. and 7.0 lbs. of 2% sodium hydroxide solution to a temperature within the range 140 to 180° F. and agitating the mixture until the casein was dispersed. The casein dispersion and 3.5 lbs. of molten commercial glycerol monostearate were then mixed with the emulsion at 150° F.

The mixture so formed was spray-dried in a commercial spray-drying plant to a moisture content below 1%, and the spray-dried powder obtained was, after cooling, blended with 0.5 lb. of sodium aluminium silicate. The resulting powder, after being screened through a fine sieve, was light and free-flowing, and highly suitable for use in baking.

*Example 2*

Powder with the composition specified in Example 1 was produced from dehydrated butter fat by following the procedure described in Example 1, but using an alternative emulsion produced as follows:

1 lb. of sodium citrate was dissolved in 50 lbs. of pasteurized skim milk and 82.0 lbs. of dehydrated butter fat were melted and mixed with the treated skim milk. The resulting mixture was then homogenized at a pressure of 700 to 800 p.s.i. and a temperature of 120° F. to form an emulsion.

Example 3

Powder with the following composition:

| | Percent |
|---|---|
| Milk fat | 82.0 |
| Commercial glycerol monostearate | 3.5 |
| Sodium caseinate-citrate mixture | 13.4 |
| Sodium aluminium silicate | 0.5 |
| Moisture | 0.6 |
| | 100.0 | was produced by a procedure as described in Example 1 but using the following ingredients:

82 lbs. of dehydrated butter fat
12.6 lbs. of dry acid casein
2.1 lbs. of sodium citrate
30.0 lbs. of water
14.7 lbs. of 2% sodium hydroxide
3.5 lbs. of commercial glycerol monostearate
0.5 lb. of sodium aluminium silicate The butter fat was melted and mixed with 20 lbs. of the casein dispersion and 35 lbs. of water and homogenized at a pressure of 700–800 p.s.i. The resulting mixture was then blended with the rest of the casein dispersion and with the melted emulsifier before the spray-drying.

Example 4

An alternative procedure for obtaining a powder with a composition specified in Example 1 is as follows:

1 lb. of sodium citrate is dissolved in 132 lbs. of pasteurized cream (62% fat) and the mixture homogenized in a double stage homogenizer at 2000+500 p.s.i. at 110° F.

6 lbs. of dry, acid casein is dispersed in 20 lbs. of skim milk by warming to 140–180° F. and by gradually adding 7 lbs. of 2% sodium hydroxide. 3.5 lbs. of commercial glycerol monostearate is melted with any required antioxidant and blended into the caseinate solution. This mixture is then added to the homogenized cream. The total mix is then pre-warmed to 150° F. and spray-dried under the conditions normally used for dry, whole milk. The total solids before drying is 58–59%.

The dry powder is cooled and then mixed with 0.5 lb. of sodium-aluminium-silicate before sieving. The product is packed in an atmosphere of nitrogen.

Example 5

A powder based on coconut oil was produced according to the procedure in Example 1 with substitution of coconut oil for the butter fat.

Example 6

A powder based on peanut oil was produced according to the procedure in Example 1 with substitution of peanut oil for the butter fat.

Example 7

Powder with the following composition:

| | Percent |
|---|---|
| Milk fat | 82.0 |
| Commercial glycerol monostearate | 3.5 |
| Skim milk solids | 6.7 |
| Sucrose | 5.7 |
| Citrate | 1.0 |
| Sodium-aluminium-silicate | 0.5 |
| Moisture | 0.6 |
| | 100.0 | was produced from cream as follows:

A mixture of 5.7 lbs. of sucrose, 3.5 lbs. of molten glycerol monostearate and 20 lbs. of skim milk was warmed to 150–180° F. and agitated until a uniform dispersion was obtained. This mixture was then mixed with 132 lbs. of pasteurized cream (62%) to which 1 lb. of citrate had been added, and which had been homogenized in a double stage homogenizer at 2000+500 p.s.i. at 110° F.

The mixture so formed was pre-warmed to 150° F. and spray-dried in a commercial spray-drying plant to a moisture content below 1%, and the spray-dried powder obtained was, after cooling, blended with 0.5 lb. of sodium aluminium silicate. The resulting powder, after being screened through a fine sieve, was light and free-flowing, and highly suitable for use in baking.

Example 8

A powder with the composition specified in Example 7 may be produced from butter fat or vegetable fat by following the procedure described in Example 9 but using instead of the 132 lbs. of cream, an emulsion produced as outlined in Example 1 or Example 2.

In the foregoing specification, all parts are by weight.

We claim:

1. In a method of making an edible fat-containing composition in powder form suitable for use as a shortening material, the steps of homogenizing an edible cream in the form of a fat-in-water dispersion containing non-fat milk solids and at least 35% water, mixing said cream with additional non-fat milk solids and with an edible fat-soluble emulsifying agent in an amount sufficient to cause partial de-emulsification of the final product but not exceeding 25% of the total non-fat solids to form a fat-in-water dispersion system having a fat content comprising at least 80% of the total solids present in the dispersion, spray-drying the mixture without breaking down the structure thereof to form a powder, cooling the spray-dried powder and blending it with at least ½% of a finely divided physiologically acceptable agent to confer free-flowing properties on the powder, the mixing of the emulsifying agent with the other ingredients not involving a homogenizing treatment, whereby a partial de-emulsification takes place when water is added to the dried powder.

2. A method as claimed in claim 1, in which the product is dried to have a moisture content below 1% by weight.

3. A method as claimed in claim 1, in which the said agent for conferring free-flowing properties is a silicate.

4. A method as claimed in claim 1, in which the said agent for conferring free-flowing properties is sodium aluminum silicate.

5. A method as claimed in claim 1, in which the said agent for conferring free-flowing properties is a phosphate.

6. A method as claimed in claim 1, in which the fat is milk fat.

7. A method as claimed in claim 1, in which the said edible cream is derived from natural cream.

8. In a method of making an edible fat-containing composition in powder form suitable for use as a shortening material, the steps of homogenizing an edible cream in the form of a fat-in-water dispersion containing non-fat solids and at least 35% water, mixing said cream with an edible fat-soluble emulsifying agent in an amount sufficient to cause partial de-emulsification of the final product but not exceeding 25% of the total non-fat solids to form a fat-in-water dispersion system having a fat content comprising at least 80% of the total solids present in the dispersion, spray-drying the mixture without breaking down the structure thereof to form a powder, cooling the spray-dried powder and blending it with at least ½% of a finely divided physiologically acceptable agent to confer free-flowing properties on the powder, the mixing of the emulsifying agent with the other ingredients not involving a homogenizing treatment, whereby a partial de-emulsification takes place when water is added to the dried powder.

9. A method as claimed in claim 1, in which the said edible cream contains skim milk solids and an edible calcium-sequestering agent.

10. A method as claimed in claim 8, in which the said edible cream contains skim milk solids and an edible calcium-sequestering agent.

11. A method as claimed in claim 9, in which the said edible cream contains a casein dispersion.

12. A method as claimed in claim 10, in which the said edible cream contains a casein dispersion.

13. A method as claimed in claim 9, in which the said edible cream comprises a homogenized mixture of skim milk, a calcium-sequestering agent, and dehydrated butter fat.

14. A method as claimed in claim 10, in which the said edible cream comprises a homogenized mixture of skim milk, a calcium-sequestering agent, and dehydrated butter fat.

15. A method as claimed in claim 1, in which sucrose is incorporated in the mixture prior to spray-drying.

16. A method as claimed in claim 1, in which the emulsifying agent comprises glycerol monostearate.

17. A method as claimed in claim 8, in which the emulsifying agent comprises glycerol monostearate.

18. A method as claimed in claim 1, in which the mixture which is submitted to spray-drying has a total solids content of 50–60%.

19. A method as claimed in claim 8, in which the mixture which is submitted to spray-drying has a total solids content of 50–60%.

References Cited by the Examiner
UNITED STATES PATENTS

| | | | |
|---|---|---|---|
| 1,966,513 | 7/1934 | Moss et al. | 99—56 |
| 2,065,675 | 12/1936 | Fechner | 99—118 |
| 2,311,598 | 2/1943 | Schwartz | 99—119 |
| 2,431,497 | 11/1947 | North et al. | 99—123 |
| 2,431,498 | 11/1947 | North et al. | 99—123 |
| 2,503,866 | 4/1950 | Chrysler et al. | 99—203 X |
| 2,673,155 | 3/1954 | Turabow | 99—56 |
| 2,854,341 | 9/1958 | Waldo | 99—143 |
| 2,913,342 | 11/1959 | Cameron et al. | 99—123 |
| 2,931,730 | 5/1960 | Schram | 99—118 |

A. LOUIS MONACELL, *Primary Examiner.*

M. W. GREENSTEIN, *Assistant Examiner.*